United States Patent [19]
Gao et al.

[11] Patent Number: 5,834,136
[45] Date of Patent: Nov. 10, 1998

[54] METHOD OF PREPARING POLYMERIC ELECTROLYTES

[75] Inventors: Feng Gao, Henderson; Porter H. Mitchell, Las Vegas, both of Nev.

[73] Assignee: Valence Technology, Inc., Henderson, Nev.

[21] Appl. No.: 664,732

[22] Filed: Jun. 17, 1996

[51] Int. Cl.$^6$ .................................................. H01M 10/40
[52] U.S. Cl. ............................................................ 429/192
[58] Field of Search ..................................... 429/189, 192

[56] References Cited

U.S. PATENT DOCUMENTS 5,501,921   3/1996   Olsen ........................................ 429/192

*Primary Examiner*—M. Nuzzolillo
*Attorney, Agent, or Firm*—Charles Jew

[57] ABSTRACT

A method of fabricating polymeric matrices suitable for use in non-aqueous electrochemical cells is provided. The method includes forming an organic emulsion comprising an organic solvent and having a polar phase comprising polar polymer precursors and a non-polar phase comprising non-polar polymer precursors wherein the polar phase is substantially immiscible in the non-polar phase, said emulsion further including an effective amount of surfactant to maintain said emulsion; and initiating polymerization of said polar polymer precursors to form first polymers and of said non-polar polymer precursors to form second polymers wherein said first polymers are crosslinked by said second polymers to form a polymeric matrix. The polymeric matrix will have superior physical strength and puncture resistance.

20 Claims, 1 Drawing Sheet

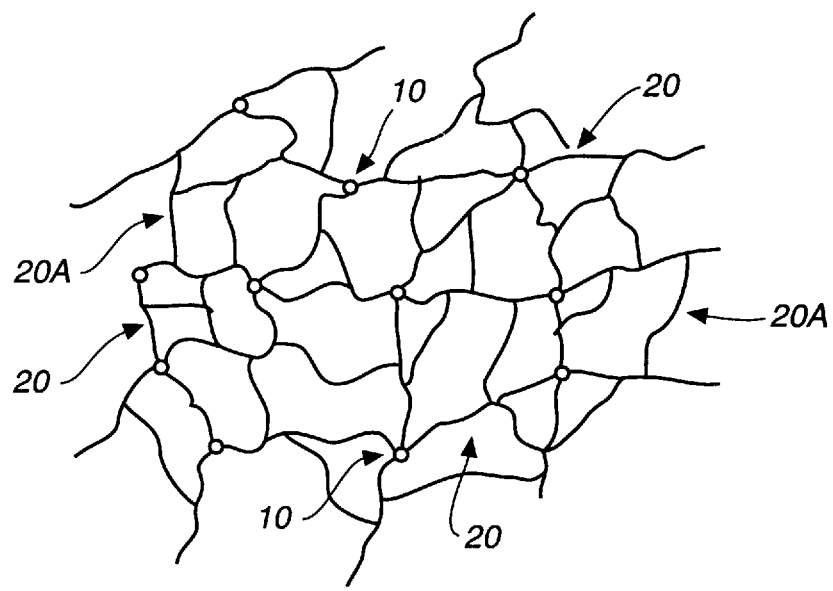
FIG._1
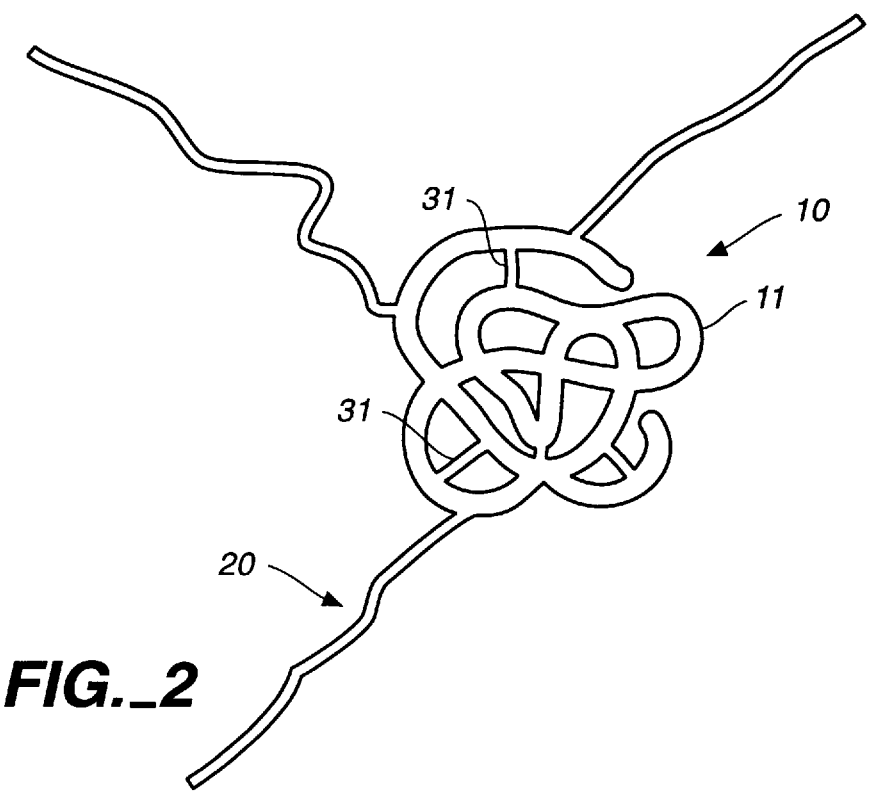
FIG._2

METHOD OF PREPARING POLYMERIC ELECTROLYTES

FIELD OF THE INVENTION

The present invention relates to electrochemical devices and, more particularly, to a method of fabricating polymeric electrolytes having superior mechanic properties for non-aqueous electrochemical cells.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Despite these advantages, present methods of fabricating electrochemical cells produce cells and batteries that are prone to short circuits. This occurs, for instance, when a current collector develops burrs or rough edges which penetrate the solid electrolyte and come into contact with an adjacent current collector.

SUMMARY OF THE INVENTION

The present invention relates to a method of preparing solid electrolytes which employs an emulsion comprising two organic phases, one phase having non-polar polymer precursors and the other having polar polymer precursors. A polymeric matrix with superior strength suitable for electrochemical devices is synthesized upon curing to cause the polymer precursors to copolymerize.

In one aspect, the invention is directed to a non-aqueous electrochemical cell comprising:
  an anode;
  a cathode; and
  a solid electrolyte having (1) a polymeric matrix comprising a graft copolymer represented by the formula poly A-graft poly B wherein poly A is a first polymer formed from non-polar polymer precursors and poly B is a second polymer formed from polar polymer precursors, wherein each first polymer is crosslinked by a second polymer to form the polymeric matrix and wherein said first polymer is characterized as a being globular and said second polymer is characterized as being linear or crosslinked, and (2) an electrolyte solution comprising an electrolyte solvent and a salt.

In another aspect, the invention is directed to a method of preparing a polymeric composition which comprises the steps of:
  forming an organic emulsion comprising an organic solvent and having a non-polar phase comprising non-polar polymer precursors and a polar phase comprising polar polymer precursors wherein the polar phase is substantially immiscible in the non-polar phase, said emulsion further including an effective amount of surfactant to maintain said emulsion; and
  initiating polymerization of said non-polar polymer precursors to form first polymers and of said polar polymer precursors to form second polymers wherein said first polymers are crosslinked by said second polymers to form a polymeric matrix.

Preferably the initiation step comprises exposing said emulsion to actinic radiation. Preferred non-polar polymer precursors are selected from the group consisting of alkenes, dienes, trienes, cyclodienes and cyclotrienes. Preferred polar polymer precursors are acrylate derivatives.

A further aspect to the invention is directed to solid electrolytes and electrochemical cells employing the inventive polymeric matrix.

BRIEF DESCRIPTION OF TIE DRAWINGS

FIGS. 1 and 2 show the structures of the non-polar and polar polymers of a polymeric matrix.

DETAILED DESCRIPTION OF THE PREFERRED EMBODIMENTS OF THE INVENTION

The present invention is directed to emulsion polymerization that is initiated by actinic radiation (e.g., E-beam curing) wherein the emulsion comprises two organic phases, one polar and the other non-polar. The polymer matrix produced contains essentially no water.

The emulsion comprises (1) an organic solvent which acts as the dispersing medium, (2) polar monomers or a partial polymers thereof (collectively referred to as polar polymer precursors), and (3) non-polar monomers or a partial polymer thereof (collectively referred to as non-polar polymer precursors). The emulsion preferably also comprises surfactants which enhance the emulsification process and stabilizers which stabilize the emulsified system. When the emulsion is exposed to actinic radiation, polymerization of the non-polar polymer precursors produces non-polar polymers that are globular-shaped. Similarly, polymerization of the polar polymer precursors produces substantially linear or crosslinked polar polymers. A cross-linked polymeric network or matrix is produced as the soft, globular-shaped particles are interconnected by the linear or crosslinked polymers. The size or molecular weight of the non-polar polymers and the length or molecular weight of the polar polymers will vary depending on the conditions of emulsification including, for example, the concentrations of the various components, and the structure of the precursors employed in the two phases.

The cross-linked polymer network is expected to demonstrate superior physical strength when employed as the polymeric matrix in an electrochemical cell. The network will prevent short circuits caused by penetration through the solid electrolyte of either the anode or cathode (or current collectors thereof).

Preferred electrochemical cells include: a cathode comprising an active material, an intercalation based carbon anode, with each electrode capable of reversibly incorporating (e.g., intercalating) an alkali metal ion, and a polymeric matrix of the present invention containing an electrolyte solution comprising an organic electrolyte solvent and a salt of the alkali metal. Each electrode preferably has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

The current collectors can comprise, for example, a screen, grid, expanded metal, woven or non-woven fabric or knitted wire formed from an electron conductive material such as metals or alloys. Particularly preferred current collectors comprise perforated metal foils or sheets. Preferably, the current collector has a thickness from about 25 μm to about 75 μm, preferably about 35 μm to about 65 μm, and more preferably about 45 μm to about 55 μm. In order to minimize the weight of the electrochemical cell, thin current collectors are preferred. It is expected that current collector having a thickness of about 12.5 μm can be employed. Each current collector is also connected to a current collector tab which extends from the edge of the current collector. The current collector tab is preferably integral to the current collector. By integral is meant that the body of the current collector and tab form a unit, that is, they are not separate members that are attached (e.g., welded) together. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

However, prior to describing this invention in further detail, the following terms will be defined.

The term "electrolytic cell" or "electrochemical cell" refers to a composite containing an anode, a cathode and a solid electrolyte interposed therebetween.

The term "battery" refers to two or more electrochemical cells electrically interconnected in an appropriate series/parallel arrangement to provide the required operating voltage and current levels.

The term "solid polymeric matrix" or "polymeric matrix" refers to an electrolyte compatible material formed by polymerizing an inorganic or organic monomer (or partial polymer thereof) and which, when used in combination with the other components of the electrolyte, renders the electrolyte solid. Solid polymeric matrices of the present invention are derived from polar polymer precursors and non-polar polymer precursors.

The polymeric matrix or network of the present invention can be characterized as a graft polymer of the formula poly A-graft poly B wherein poly A are first polymers formed from non-polar polymer precursors and poly B are second polymers formed from polar polymer precursors in the emulsion. The first polymers, being non-polar, have a generally spherical configuration in the polar solvent. The polymeric matrix comprises multiple first polymers which are connected together by the second polymers which are linear or crosslinked. As illustrated in FIG. 1, the matrix or network is expected to comprise non-polar polymers 10 that are each folded into compact spherical or globular shapes. These non-polar polymers are interconnected to each other by the polar polymers 20 which are linear or crosslinked. The polar polymers will be crosslinked if the polar monomers or partial polymers from which they are derived comprise polyacrylates such as, for example, di, tri, tetra, or pentaacrylates. As shown in FIG. 1, the polar polymers 20 are interconnected by branched chains 20A. Preferably, poly A has an average molecular weight of about 100,000 to 300,000 daltons and poly B has an average molecular weight of about 50,000 to 600,000 daltons.

As shown in FIG. 2, the non-polar polymer 10 comprises folded polymer chain 11. When the non-polar monomers or partial polymers comprise polyfunctional instead of only difunctional units, the non-polar polymer chain 11 will be crosslinked by branched polymer chains 31 as shown. The globular structure of the non-polar polymers imparts resiliency or elasticity to the matrix because the non-polar polymers can stretch or expand in response to an external mechanical force and therefore is characterized as a "soft" particle. Furthermore, when employed in a solid electrolyte, the matrix itself functions as a physical barrier against foreign objects that would otherwise puncture conventional polymeric matrices.

As is apparent, each globular non-polar polymer and its associated polar polymers represents a star polymer which contains two or more polymer chains emanating from a central structural unit. Thus, the term "graft polymer" refers to polymers where the globular non-polar polymer chain represents the "backbone" which is crosslinked by the polar polymers.

The term "non-polar polymer precursor" refers to non-polar multifunctional monomers and reactive oligomers thereof that can be polymerized to form non-polar polymers that preferably have an average molecular weight of about 80 to about 25,000, more preferably about 120 to about 10,000, and most preferably about 160 to about 6,000 daltons.

Preferably, the non-polar polymer precursor is selected from the group consisting of: (1) alkenes, $C_nH_{2n}$ where n is about 6–10, (2) dienes $C_nH_{2n-2}$ where n is about 4–10, (3) trienes $C_nH_{2n-4}$ where n is about 6–10, (4) cyclodienes where n is about 6–10, and (5) cyclotrienes $C_nH_{2n-6}$ where n is about 7 to 10. Preferably non-polar polymer precursors include, for example, 1,3-butadiene, cycloheptatreiene, 1,9-decadiene, 1,5,9-decatriene, 1,5-dimethyl-1,5-cyclooctadiene, 2,5-dimethyl-2,4-hexadiene, dipentene, 1,5, 9-heptatriene, hexadiene, hexene, myrcene, 1,7-octadiene, 4-vinyl-1-cyclohexene, polybutadiene diacrylates (MW: 500–5000), and mixtures thereof. A preferred non-polar polymer precursor comprises:

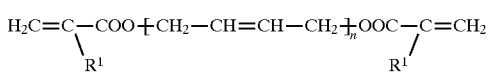

wherein $R^1$ is a hydrogen or a methyl group and n is about 6–90.

The term "polar polymer precursor" refers to polar multifunctional monomers and reactive oligomers thereof that can be polymerized to form linear or crosslinked polymers that preferably have an average molecular weight of about 80 to about 25,000, more preferably about 120 to about 10,000, and most preferably about 160 to about 6,000 daltons.

Preferably, the polar polymer precursor is selected from the group consisting of: (1) allyl acrylates represented by the formula I, (2) acrylates having the formula II, (3) diacrylates having the formula II, and (4) polyacrylates having the formula IV, (5) oligomers having the formulae V and VI (or mixtures thereof).

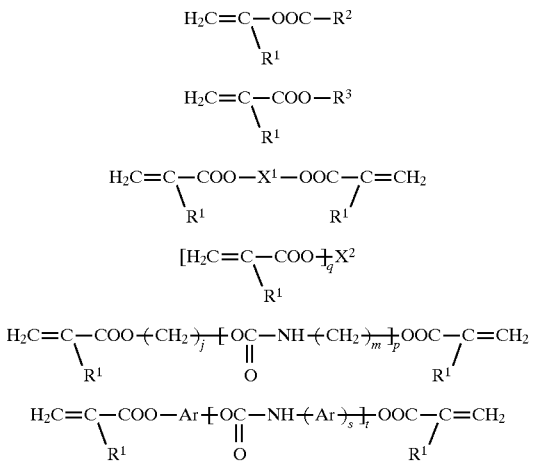

wherein j is an integer from 1 to about 5, q is 3, 4 or 5, m is an integer from 1 to about 5, p is an integer from about 4 to about 250, s is 1 or 2, t is an integer from 4 to about 250, Ar is comprised of carbon or carbon and nitrogen atoms sufficient to form a 5 or 6 membered aromatic ring or at least one other ring condensed with said 5 or 6 membered aromatic ring, $R^1$ is hydrogen or a methyl group, $R^2$ is an alkoxy or alkyl having 1 to about 8 carbons, preferably about 2 to 7 carbons, and more preferably about 4 to about 6 carbons, $R^3$ is an alkoxy or alkyl group having 1 to about 8 carbons, preferably about 2 to about 7 carbons, and more preferably about 4 to about 6 carbons, $X^1$ is —$(CH_2)_l$— where l is an integer from 1 to about 4 and —$CH_2CH_2CH_2O$—, provided that when q is 3, $X^2$ has structure VII,

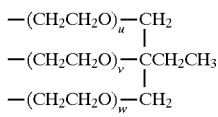

where u, v, and w are each integers and where u+v+w=0–14, when q is 4, $X^2$ is pentaerythritol, and when q is 5, $X^2$ is dipentaerythritol.

Preferably Ar is a benzyl, methyl benzyl or dimethyl benzyl group. Preferably polar polymer precursors include, for example, alkyl and aryl acrylates selected from: allyl acrylate, allyl methacrylate, 1,4-butanediol dimethylacrylate, butyl methacrylate, cyclohexyl acrylate, cyclohexyl methacrylate, dipentaerythritol pentaacrylate, 2-(2-ethoxyethoxy)ethyl acrylate, 2-ethoxyethyl acrylate, 2-ethoxyethyl methacrylate, ethyl acrylate, ethylene glycol diacrylate, ethylene glycol dimethacrylate, ethyl methacrylate, ethyl-2-methyl-4-pentenoate, 2-methoxyethyl acrylate, methyl methacrylate, methyl-3,3-dimethyl-4-pentenoate, 2-ethoxyethyl acrylate, 2-ethoxyethyl methacrylate, ethylene diacrylate, pentaerythritoltetraacrylate, propoxylated glycerol triacrylate, propoxylated trimethylol propane triacrylate, tri-methylpropane ethoxy triacrylate, trimethylolpropane triacrylates (TMPTA), tripropylene glycol diacrylate, aliphatic and aromatic urethane acrylate oligomers, and mixture thereof.

The non-polar polymer precursor preferably comprises about 1% (wt) to about 30% (wt), more preferably about 3% (wt) to about 20% (wt), and most preferably about 5% (wt) to about 12% (wt) of the emulsion. For crosslinking of the non-polar polymers, preferably the non-polar polymer precursors comprises about 0.3% (wt) to 5% (wt), preferably about 0.4% (wt) to about 4% (wt), more preferably about 0.5% (wt) to about 3% (wt) of said dienes, trienes, cyclotrienes and/or tetraenes. The polar polymer precursor preferably comprises about 0.5% (wt) to about 30% (wt), more preferably about 1% (wt) to about 15% (wt), and most preferably about 2.5% (wt) to about 8.5% (wt) of the emulsion. For crosslinking of the polar polymers, the polar polymer precursors comprises about 0.3% (wt) to 5% (wt), preferably about 0.4% (wt) to about 4% (wt), more preferably about 0.5% (wt) to about 3% (wt) of said polyacrylates. Most preferably, the non-polar precursor forms a non-polar phase that is substantially non-miscible in the polar phase formed by the polar polymer precursors.

Preferred solvents for the emulsion are any suitable organic solvent in which the polar polymer precursor is substantially soluble and in which the non-polar polymer precursor is substantially insoluble. Solvents include, for example, polar solvents such as bis(2-methoxyethyl) carbonate, diethyl carbonate, dimethyl carbonate, ethylene carbonate, propylene carbonate, and mixtures thereof. The solvent for the emulsion preferably comprises about 50% (wt) to about 90% (wt), more preferably about 60% (wt) to about 80% (wt), and most preferably about 70% (wt) to about 75% (wt) of the emulsion.

Preferably, the emulsion also includes surfactants and stabilizers. Surfactants include, for example, decyl acrylate, ethyl tridecanoate, ethyl undecylenate, isodecyl acrylate, tridecyl methacrylate, vinyl decanoate, and mixtures thereof. The surfactant preferably comprises about 0.1% (wt) to about 2% (wt), more preferably about 0.2% (wt) to about 1.8% (wt), and most preferably about 0.5% (wt) to about 1.2% (wt) of the emulsion.

Stabilizers are polymers that stabilize the emulsion. Preferred stabilizers include, for example, polyacetonitriles, polyacrylamides, polyethylene oxides, polypropylene oxides, polymethaacrylates, polyvinylidene difluorides, poly(vinylidene difluoride-co-hexafluoropropylene)s, poly{bis[2-(2-methoxyethox)ethoxy]phosphazene}, polyvinyl chlorides, and mixtures thereof. The stabilizer preferably comprises about 0.5% (wt) to about 6% (wt), more preferably about 0.8% (wt) to about 5% (wt), and most preferably about 1% (wt) to about 4% (wt) of the emulsion.

The term "a partial polymer" refers polar and non-polar monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, in the presence of a solvent, to form solid polymeric matrices which are suitable for use as solid electrolytes in electrolytic cells.

The term "cured" or "cured product" refers to the treatment of the polar and non-polar polymer precursors under polymerization conditions (including cross-linking) so as to form a solid polymeric matrix. Suitable polymerization conditions are well known in the art and include by way of example, heating the monomer, irradiating the monomer with UV light, electron beams, and other forms of actinic radiation.

The emulsion containing the polar and non-polar polymer precursors can be cured or further cured prior to or after addition of the salt and optionally, a viscosifier. One advantage of the prevent invention is that the solvent(s) employed in the emulsion can also be, if desired, used as the electrolyte solvent(s). This obviates the need for removing the emulsion solvent after polymerization and then adding the electrolyte solvent. In a preferred method, an emulsion composition comprising requisite amounts of the polar and non-polar polymer precursors, salt, surfactant, stabilizer and solvent can be applied to a substrate and then cured by exposure to actinic radiation to form a solid electrolyte film. Thereafter, solvent can added or removed from the film to produce a solid electrolyte with the desired electrolyte solvent concentration. Alternatively, after the solid electrolyte has been formed, the emulsion solvent can be substantially removed and replaced with an electrolyte solvent. In either case, the resulting solid electrolyte does not readily separate upon cooling to temperatures below room temperature.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, NASCN, and the like. The inorganic ion salt preferably contains at least one cation selected from the group consisting of Li, Na, Cs, Rb, Ag, Cu, Mg and K. The salt can be added before or after the polymerization of the precursors in the emulsion.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, may be added in the electrolyte.

The term "organic carbonate" refers to hydrocarbyl carbonate compounds of no more than about 12 carbon atoms and which do not contain any hydroxyl groups. Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x \leq 2$. Blends can also include $Li_y$-α-$MnO_2$ ($0 \leq y<1$) which is $Li_yNH_4Mn_8O_{16}$ ($0 \leq y<1$) which has a hollandite-type structure. $Li_y$-α-$MnO_2$ where $0 \leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

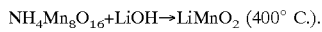

$NH_4Mn_8O_{16}+LiOH \rightarrow LiMnO_2$ (400° C.).

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2$ $0 \leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. No. 5,300,373, 5,316,556, 5,346,385, 5,262,253, 4,472,487, 4,668,595, and 5,028,500, all of which are incorporated herein. The inventive method can be employed to fabricated solid electrolytes suitable for prior art electrochemical cells.

Example 1 describes the procedure for fabricating a solid electrolyte. Examples 2 and 3 describe the process of preparing the anode and cathodes, respectively. Example 4 describes the procedures for fabricating a solid electrolytic cell.

EXAMPLE 1

An initial mixture having the following components was prepared:

polar precursors: 0.5 g TMPTA, 1 g methyl methacrylate, 6.5 g urethane acrylate non-polar precursors: 4 g 4-vinylcyclohexene and 8 g polybutadiene diacrylate solvents: 15 g ethylene carbonate (EC) and 15 g propylene carbonate(PC)

surfactant: 1 g ethyl undecylenate

The mixture was mixed in high shear emulsifier until an even emulsion was formed. To this emulsion, was added a predissolved solution containing 1.5 g polyethylene oxide (stablizer), 9 g $LiPF_6$ in a mixture of 14.25 g EC and 14.25 g PC slowly with vigorous mixing. After the addition, the mixture was further emulsified until the desired level of emulsification as confirmed by the micro particle size measurement was achieved.

Thin films of this emulsion solution can be casted onto a substrate, such as, for example, glass, Mylar film or electrode films and polymerized by exposure to electron beam.

EXAMPLE 2

The anode slurry was prepared as follows:

A polymer mixture comprising a copolymer of vinylidenedifluoride VDF and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto a current collector. Anode films form when the remaining portion of the acetone evaporates.

EXAMPLE 3

The cathode slurry was prepared as follows:

A polymer mixture comprising a copolymer of vinylidenedifluoride VDF and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material comprising $Li_xMn_2O_4$ (spinel) ($0 \leq x < 2$), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the cathode slurry wherein the components are well mixed. A portion of the acetone is allowed to evaporate from the slurry before it was laminated onto a current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the metal sheet.

EXAMPLE 4

In a preferred process, the dibutyl phthalate plasticizer is first extracted from the anode and cathode precursors formed in Examples 2 and 3, respectively. Extraction can be accomplished using conventional organic liquid solvents such as diethyl ether or by supercritical fluids which includes, for example, a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide. The term "plasticizer" refers to an organic solvent, with limited solubility of polymers, that facilitates the formation of porous polymeric structures which improves electrochemical cell performance. By "porous structure" is meant that upon extraction of the plasticizer the polymer remains as a porous mass.

Following removal of the dibutyl phthalate plasticizer, a solution containing an inorganic salt and electrolyte solvent is added into the porous portions of the anode and cathode prior to being assembled into an electrochemical cell. The electrochemical cell is charged by an external energy source prior to use.

A solid electrochemical cell is prepared by first positioning the solid electrolyte between the anode and cathode and thereafter fusing the structures under moderate pressure and temperature (e.g., 130° C.).

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \approx 1.0.$$

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An non-aqueous electrochemical cell comprising:

an anode;

a cathode; and a solid electrolyte having (1) a polymeric matrix comprising a graft copolymer represented by the formula poly A-graft poly B wherein poly A is a first polymer formed from non-polar polymer precursors and poly B is a second polymer formed from polar polymer precursors, and wherein each first polymers is crosslinked by said second polymer to form the polymeric matrix and wherein said first polymer is characterized as a being globular and said second polymer is characterized as being linear or crosslinked, and (2) an electrolyte solution comprising an electrolyte solvent and a salt.

2. The electrochemical cell of claim 1 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

3. The electrochemical cell of claim 2 wherein poly A has an average molecular weight of about 10,000 to about 300,000 daltons.

4. The electrochemical cell of claim 1 wherein the polar polymer precursor is selected from the group consisting of: (1) allyl acrylates represented by the formula I, (2) acrylates having the formula II, (3) diacrylates having the formula III, and (4) polyacrylates having the formula IV, (5) oligomers having the formulae V and VI and mixtures thereof,

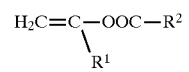

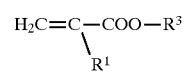

-continued

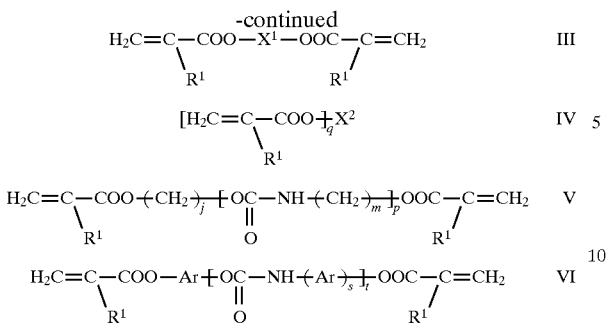

wherein j is an integer from 1 to about 5, q is 3, 4 or 5, m is an integer from 1 to about 5, p is an integer from about 4 to about 250, s is 1 or 2, t is an integer from 4 to about 250, Ar is comprised of carbon or carbon and nitrogen atoms sufficient to form a 5 or 6 membered aromatic ring or at least one other ring condensed with said 5 or 6 membered aromatic ring, $R^1$ is hydrogen or a methyl group, $R^2$ is an alkoxy or alkyl having 1 to about 8 carbons, $R^3$ is an alkoxy or alkyl group having 1 to about 8 carbons, $X^1$ is —$(CH_2)_l$— where l is an integer from 1 to about 4 and —$CH_2CH_2CH_2O$—, provided that when q is 3, $X^2$ has structure VII,

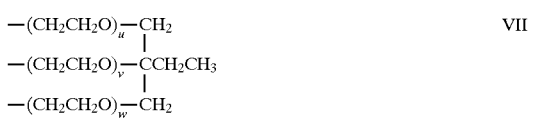

where u, v, and w are each integers and where u+v+w=0–14, when q is 4, $X^2$ is pentaerythiritol, and when q is 5, $X^2$ is dipentaerythritol.

5. The electrochemical cell of claim 4 wherein poly B has an average molecular weight of about 50,000 to about 600,000 daltons.

6. The electrochemical cell of claim 4 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

7. A method of preparing a polymeric composition which comprises the steps of:
forming an organic emulsion comprising an organic solvent and having a non-polar phase comprising non-polar polymer precursors and a polar phase comprising polar polymer precursors wherein the polar phase is substantially immiscible in the non-polar phase, said emulsion further including an effective amount of surfactant to maintain said emulsion; and
initiating polymerization of said non-polar polymer precursors to form first polymers and of said polar polymer precursors to form second polymers wherein said first polymers are crosslinked by said second polymers to form a polymeric matrix.

8. The method of claim 7 wherein the initiation step comprises exposing said emulsion actinic radiation.

9. The method of claim 7 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

10. The method of claim 9 wherein said first polymers have an average molecular weight of about 10,000 to about 300,000 daltons.

11. The method of claim 7 wherein the polar polymer precursor is selected from the group consisting of: (1) allyl acrylates represented by the formula I, (2) acrylates having the formula II, (3) diacrylates having the formula III, and (4) polyacrylates having the formula IV, (5) oligomers having the formulae V and VI and mixtures thereof,

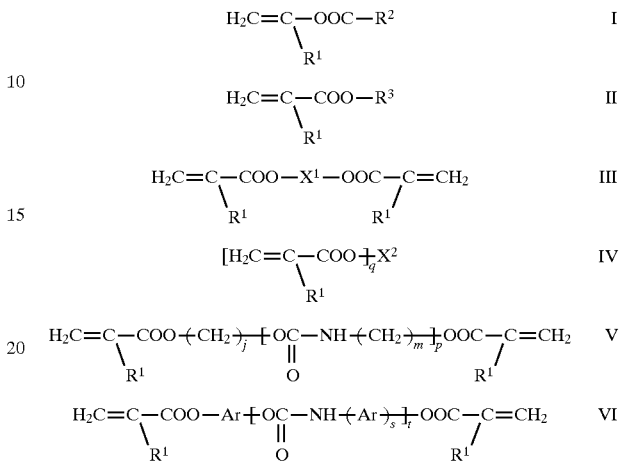

wherein j is an integer from 1 to about 5, q is 3, 4 or 5, m is an integer from 1 to about 5, p is an integer from about 4 to about 250, s is 1 or 2, t is an integer from 4 to about 250, Ar is comprised of carbon or carbon and nitrogen atoms sufficient to form a 5 or 6 membered aromatic ring or at least one other ring condensed with said 5 or 6 membered aromatic ring, $R^1$ is hydrogen or a methyl group, $R^2$ is an alkoxy or alkyl having 1 to about 8 carbons, $R^3$ is an alkoxy or alkyl group having 1 to about 8 carbons, $X^1$ is —$(CH_2)_l$— where l is an integer from 1 to about 4 and —$CH_2CH_2CH_2O$—, provided that when q is 3, $X^2$ has structure VII,

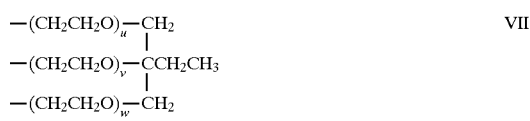

where u, v, and w are each integers and where u+v+w=0–14, when q is 4, $X^2$ is pentaerythritol, and when q is 5, $X^2$ is dipentaerythritol.

12. The method of claim 11 wherein said second polymers have an average molecular weight of about 50,000 to about 600,000 daltons.

13. The method of claim 11 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

14. A method of preparing an non-aqueous electrochemical cell which comprises the steps of:
providing an anode;
providing a cathode;
preparing a polymeric electrolyte by:
(i) forming an organic emulsion comprising an organic solvent and having a non-polar phase comprising non-polar polymer precursors and a polar phase comprising polar polymer precursors wherein the polar phase is substantially immiscible in the non-polar phase, said emulsion further including an effective amount of surfactant to maintain said emulsion;

(ii) initiating polymerization of said non-polar polymer precursors to form first polymers and of said polar polymer precursors to form second polymers wherein said first polymers are crosslinked by said second polymers to form a polymeric matrix; and (iii) adding an inorganic salt to said polymeric matrix; and interposing said polymeric electrolyte between said anode and cathode.

15. The method of claim 14 wherein the initiation step comprises exposing said emulsion to actinic radiation.

16. The method of claim 14 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

17. The method of claim 16 wherein said first polymers have an average molecular weight of about 10,000 to about 300,000 daltons.

18. The method of claim 14 wherein the polar polymer precursor is selected from the group consisting of: (1) allyl acrylates represented by the formula I, (2) acrylates having the formula II, (3) diacrylates having the formula III, and (4) polyacrylates having the formula IV, (5) oligomers having the formulae V and VI and mixtures thereof,

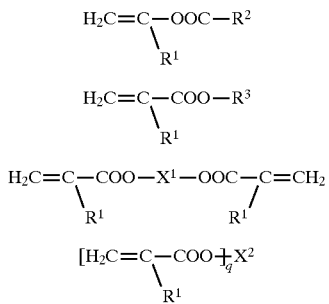

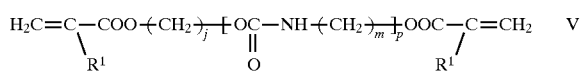

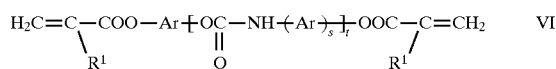

wherein j is an integer from 1 to about 5, q is 3, 4 or 5, m is an integer from 1 to about 5, p is an integer from about 4 to about 250, s is 1 or 2, t is an integer from 4 to about 250, Ar is comprised of carbon or carbon and nitrogen atoms sufficient to form a 5 or 6 membered aromatic ring or at least one other ring condensed with said 5 or 6 membered aromatic ring, $R^1$ is hydrogen or a methyl group, $R^2$ is an alkoxy or alkyl having 1 to about 8 carbons, $R^3$ is an alkoxy or alkyl group having 1 to about 8 carbons, $X^1$ is —$(CH_2)_l$— where l is an integer from 1 to about 4 and —$CH_2CH_2CH_2O$—, provided that when q is 3, $X^2$ has structure VII,

where u, v, and w are each integers and where u+v+w=0–14, when q is 4, $X^2$ is pentaerythritol, and when q is 5, $X^2$ is dipentaerythritol.

19. The method of claim 18 wherein said second polymers have an average molecular weight of about 50,000 to about 600,000 daltons.

20. The method of claim 18 wherein the non-polar polymer precursor is selected from the group consisting of: (1) alkenes having about 6 to about 10 carbons, (2) dienes having about 4 to about 10 carbons, (3) trienes having about 6 to about 10 carbons, (4) cyclodienes having about 6 to about 10 carbons, and (5) cyclotrienes having 7 to about 10 carbons.

* * * * *